(12) United States Patent
Hirono

(10) Patent No.: US 7,023,158 B2
(45) Date of Patent: Apr. 4, 2006

(54) MOTOR CONTROL APPARATUS

(75) Inventor: Daisuke Hirono, Isesaki (JP)

(73) Assignee: Sanden Corporation, Gunma (JP)

( * ) Notice: Subject to any disclaimer, the term of this patent is extended or adjusted under 35 U.S.C. 154(b) by 9 days.

(21) Appl. No.: 10/926,245

(22) Filed: Aug. 26, 2004

(65) Prior Publication Data

US 2005/0057204 A1    Mar. 17, 2005

(30) Foreign Application Priority Data

Sep. 12, 2003 (JP) ............................. 2003-321928

(51) Int. Cl.
*H02P 6/20* (2006.01)
(52) U.S. Cl. ...................... 318/431; 318/254; 318/721
(58) Field of Classification Search ................ 318/138, 318/254, 430, 431, 439, 720–724
See application file for complete search history.

(56) References Cited

U.S. PATENT DOCUMENTS

| | | | |
|---|---|---|---|
| 5,208,518 A * | 5/1993 | Grapenthin et al. ........ | 318/138 |
| 5,616,994 A * | 4/1997 | Nagaoka et al. ............ | 318/254 |
| 5,955,861 A * | 9/1999 | Jeong et al. ................ | 318/701 |
| 6,034,494 A | 3/2000 | Kitamine et al. | |
| 6,388,416 B1 | 5/2002 | Nakatani et al. | |
| 6,462,492 B1 | 10/2002 | Sakamoto et al. | |
| 6,597,140 B1 * | 7/2003 | Takayama et al. .......... | 318/445 |

FOREIGN PATENT DOCUMENTS

JP    2001 054295    2/2001

* cited by examiner

*Primary Examiner*—Bentsu Ro
(74) *Attorney, Agent, or Firm*—Baker Botts L.L.P.

(57) ABSTRACT

A motor control apparatus capable of easily and reliably determining the completion of starting of a synchronous motor and not requiring an arithmetic unit having high processing ability for the determination. When an operation command including a predetermined target rotation speed is received in a state where the motor is at rest, PWM signals are created on the basis of a starting voltage set by a starting voltage setting section and a starting phase set by a starting phase setting section, whereby the motor is started. After the start of the motor, a starting rotation speed setting section makes the processing to increase the starting rotation speed. When the starting rotation speed reaches a predetermined value smaller than the target rotation speed, it is determined that the starting is completed, and a shift is made from starting operation to normal operation.

3 Claims, 3 Drawing Sheets

MOTOR CONTROL APPARATUS

CROSS-REFERENCE TO A RELATED APPLICATION

This nonprovisional application claims priority under 35 U.S.C. § 119(a) on Patent Application No. 2003-321928 filed in Japan on Sep. 12, 2003, the entire contents of which are hereby incorporated by reference.

BACKGROUND OF THE INVENTION

1. Field of the Invention

The present invention relates to a motor control apparatus that improves the starting process of a synchronous motor used to drive a compressor of an air conditioner or the like.

2. Description of the Related Art

Disclosed in JP-A-2001-54295 is a sensorless motor control apparatus that comprises means for detecting electric current flowing through coils of a synchronous motor, means for detecting the phase difference between current and voltage supplied to the coils, and means for detecting completion of starting of the synchronous motor based on the phase difference. In this control apparatus, the phase difference between current and voltage after the start of the synchronous motor is detected, and the detection is repeated while changing the voltage and frequency of electric power supplied to the coils, if a variation in the detected phase differences is larger than a predetermined value. When the variation in phase difference is reduced to be within a predetermined range, it is determined that the starting is completed.

However, this motor control apparatus entails a drawback that much time is required to determine the completion of starting since the determination must be repeated as long as a variation in the detected phase differences is larger than the predetermined value, and entails a drawback that an arithmetic unit is required to have high processing ability since it has to perform the complicated determination processing.

SUMMARY OF THE INVENTION

An object of the present invention is to provide a motor control apparatus capable of easily and reliably determining the completion of starting of a synchronous motor, without the need of an arithmetic unit having high processing ability.

According to the present invention, there is provided a motor control apparatus comprising PWM signal generation means for creating PWM signals based on voltage and voltage phase that are individually set by voltage setting means and voltage phase setting means, and inverter means for converting DC power into predetermined pseudo AC power in accordance with the PWM signals and for outputting the AC power to a synchronous motor such as a brushless DC motor. This motor control apparatus further comprises starting means for starting the motor with a predetermined voltage and voltage phase when receiving an operation command, in which a predetermined target rotation speed is specified, in a state where the synchronous motor is at rest and for gradually increasing a motor speed after the starting of the motor, and operation changeover means for changing starting operation to normal operation when the motor speed reaches a predetermined value smaller than the target rotation speed.

According to this invention, when an operation command specifying a predetermined target rotation speed is received in a state where the motor is at rest, the motor is caused to start with the predetermined voltage and voltage phase. After the starting, the motor speed is gradually increased, and when the motor speed reaches a predetermined value lower than the target rotation speed, the completion of starting is determined and a starting operation is changed to a normal operation. Thus, it is enough to determine the completion of starting only once, and thus the determination is easy to perform and reliable. Since the determination of completion of starting does not require an arithmetic unit of high processing ability, the cost of the control apparatus can be reduced.

The above object, other objects, structural features, and functions and advantages of this invention will be apparent from the following description and the appended drawings.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PREFERRED EMBODIMENTS

Figure 1:
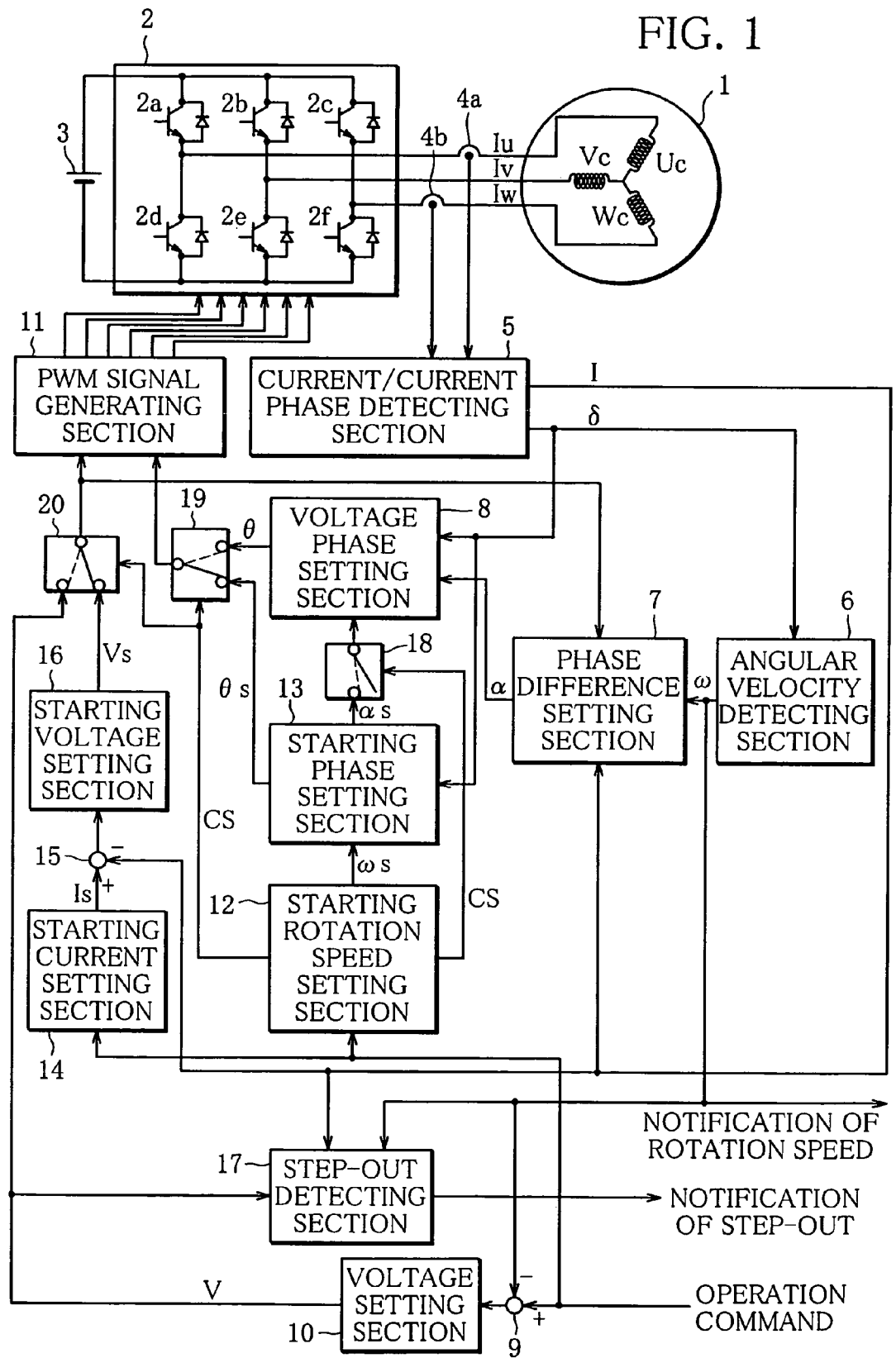
FIG. 1 is a block diagram showing a motor control apparatus according to an embodiment of this invention.

With reference to FIG. 1, a motor control apparatus according to an embodiment of this invention will be explained.

In FIG. 1, a motor 1 is a brushless DC motor comprised of an armature including three phase windings or coils Uc, Vc, Wc and a rotor including a permanent magnet. The motor 1 is rotatably driven by pseudo AC power supplied from an inverter section 2 to the three phase coils Uc, Vc, Wc.

The inverter section 2 comprises three pairs of switching elements 2a, 2d; 2b, 2e; 2c, 2f comprised of IGBTs or the like and connected in parallel with a DC power source 3 that is comprised of a battery or the like. These six switching elements 2a–2f of the inverter section 2 are turned on and off by PWM signals supplied from a PWM signal generating section 11, so as to convert the DC power into pseudo AC power and outputs the AC power to the three phase coils Uc, Vc, Wc of the motor 1.

Current sensors 4a, 4b detect two of the currents flowing through the three phase coils Uc, Vc, Wc of the motor. Detected in this embodiment are the U- and W-phase currents Iu, Iw flowing through the U- and W-phase coils Uc, Wc. For the current sensors 4a, 4b, well known current sensors may be used each of which is comprised of a coil, a Hall element, and the like.

A current/current phase detecting section 5 makes a calculation to detect a current (current peak value) I and current phase $\delta$ based on the two U- and W-phase currents Iu, Iw detected by the current sensors 4a, 4b. In the following, a method for calculating the current I and the current phase $\delta$ will be explained.

If the current value and the current phase are individually indicated by I and $\delta$ as mentioned above, the U-, V- and W-phase currents Iu, Iv and Iw can be represented as follows: $Iu = I \times \cos(\delta)$, $Iv = I \times \cos\{\delta - (2/3)\pi\}$, and $Iw = I \times \cos\{\delta + (2/3)\pi\}$. Therefore, the current I and the current phase $\delta$ can be determined, if two of the currents flowing through the three phase coils Uc, Vc, Wc are known.

When the U- and W-phase currents Iu, Iw are detected, the current I and the current phase $\delta$ can be determined in accordance with the relationship of Iv=−Iu−Iw and the following formulae (derived from the foregoing formulae):

$$I=\sqrt{(2/3) \times (Iu^2+Iv^2+Iw^2)},$$

$$\cos(\delta)=Iu/I, \text{ and}$$

$$\sin(\delta)=(Iv-Iw)/(\sqrt{3} \times I).$$

Meanwhile, the current phase δ determined in this manner can be affected by harmonic components, resulting in waveform turbulence. It is therefore desirable to perform waveform shaping by means of known filtering with a LPF (low pass filter) or the like to remove the harmonic components. Of course, such filtering may be made by digital calculations utilizing an FIR filter, an IIR filter, or the like.

An angular velocity detecting section 6 calculates the angular velocity ω of induced voltage ωΨ (refer to FIG. 2) based on the current phase δ determined by the current/current phase detecting section 5. More specifically, the angular velocity δ (rad/sec) is calculated in accordance with the following formula:

$$\omega = \{\delta(t)-\delta(t-1)\}/\Delta t,$$

where Δt(sec) indicates the cycle of fetching the current phase δ; δ(t−1), the current phase fetched at the time of t−1; and δ(t), the current phase fetched at the time of t.

Meanwhile, the angular velocity ω determined in this manner can greatly vary on each cycle if Δt is short, and thus it is desirable to perform processing to reduce variations by means of known filtering using a LPF (low pass filter) or the like in determining the angular velocity ω. Of course, such filtering may be made by digital calculations utilizing an FIR filter, an IIR filter, or the like.

A phase difference setting section 7 calculates phase difference α between voltage and current on the basis of the current I detected by a current/current phase detecting section 5, the angular velocity ω detected by the angular velocity detecting section 6, and a target current phase lead angle β. In the following, a method of calculating the phase difference α between voltage and current will be explained with reference to FIG. 2.

Figure 2:
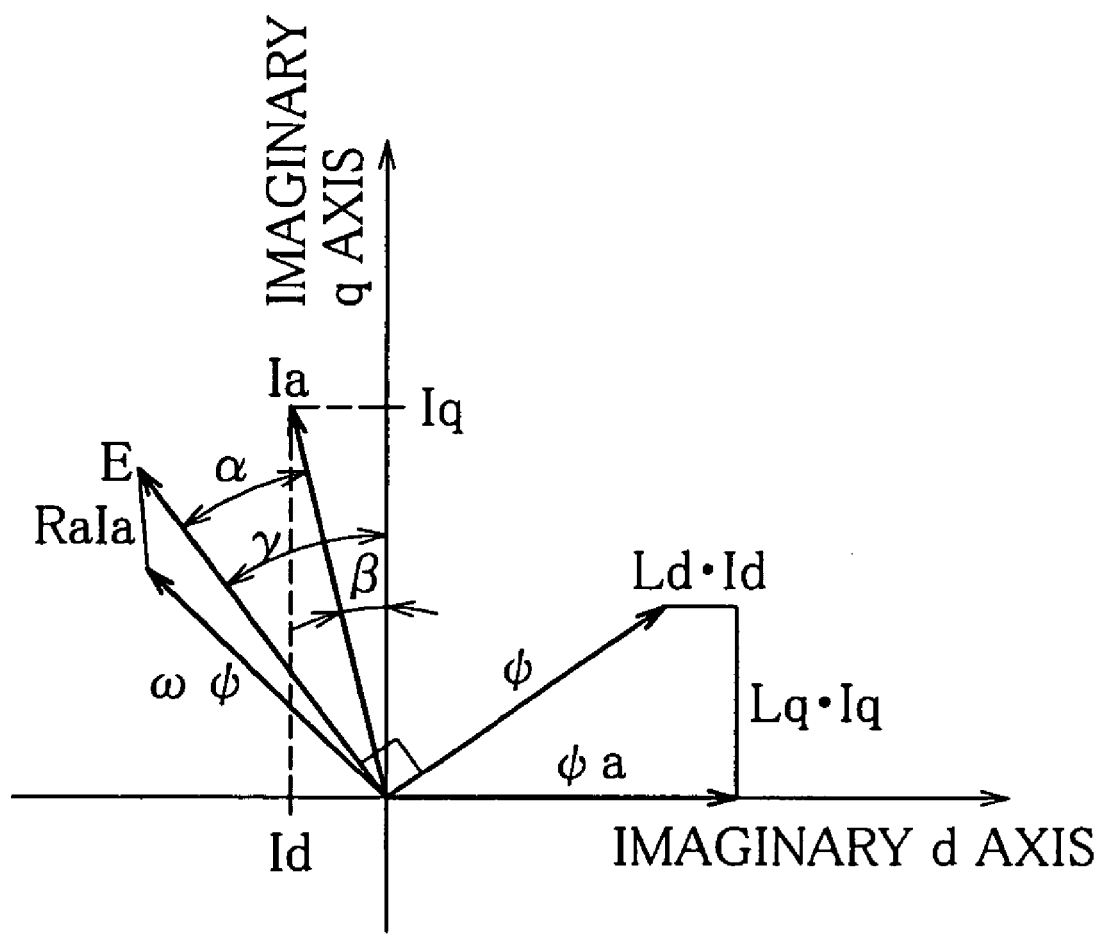
FIG. 2 is a motor vector diagram of a rotating axis system in reference to armature flux.

FIG. 2 is a motor vector diagram of a rotating axis system (imaginary d- and p-axes) with armature flux taken as a reference. In FIG. 2, Ia denotes the current (current peak value) determined when the N pole of the rotor is taken as a reference position. The d- and p-axis components Id, Iq of the current Ia can be determined from the following formula:

$$\begin{pmatrix} Id \\ Iq \end{pmatrix} = \sqrt{(2/3)} \begin{pmatrix} \cos\phi & \cos\{\phi-(2\pi/3)\} & \cos\{\phi+(2\pi/3)\} \\ -\sin\phi & -\sin\{\phi-(2\pi/3)\} & -\sin\{\phi+(2\pi/3)\} \end{pmatrix} \begin{pmatrix} Iu \\ Iv \\ Iw \end{pmatrix}$$

where φ represents an angle or an angle difference between the axis position of the armature core and the position of the U-phase coil on the coordinate.

The current Ia is represented as: Ia=√(Id²+Iq²)=I, so that it is equal to the aforementioned current I irrespective of the angle φ on the coordinate.

Here, the angle φ is unknown since the armature flux is used as the reference. On the other hand, the relationship of Ia=I is satisfied, and the target current phase lead angle is represented as β, so that the d-axis component Id and the q-axis component Iq can be determined from the current I and the current phase lead angle β in accordance with the following formulae:

$$Id=-I \times \sin(\beta), \text{ and } Iq=I \times \cos(\beta).$$

If the d-axis inductance is Ld, the q-axis inductance is Lq, the coil resistance of the motor 1 is Ra, the magnetic flux of the rotator magnet is Ψa, and the induced voltage is ωΨ, which are motor constants, the total armature interlinkage flux Ψ and voltage Va (corresponding to the later-mentioned voltage V) can be determined by vector calculations in accordance with the following formulae:

$$\Psi=\Psi a+(Ld \times Id)+(Lq \times Iq), \text{ and}$$

$$Va=\omega\Psi+(Ra \times Ia).$$

Thus, the voltage phase lead angle γ with respect to the imaginary q-axis can be calculated, and hence the desired phase difference a between voltage and current can be determined from the formula of α=γ−β. It is preferable to perform PI control, P control, or the like, to suppress a sudden variation in the phase difference α which can affect the below-mentioned voltage phase θ and can cause the step-out.

Meanwhile, the phase difference α can also be determined from the current I and the angular velocity (motor rotation speed) ω, instead of making the just-mentioned calculations. In case that such method is adopted for the phase difference determination, the aforementioned calculation or experiment alternative to such calculation is made beforehand for various combinations of current and angular velocity, and results of calculations or experiments are stored in advance in a memory in the form of a phase difference data table. In the phase difference determination, the desired phase difference α, corresponding to the current I and angular velocity ω that serve as parameters, is selected from the phase difference data table.

A voltage phase setting section 8 makes a calculation to set the voltage phase θ based on the current phase δ detected by the current/current phase detecting section 5 and the phase difference α set by the phase difference setting section 7. This voltage phase θ is used as the voltage phase when the PWM signal generating section 11 creates PWM signals for normal operation. The voltage phase setting section 8 also has a function of bringing, by means of PI control, P control or the like, the below-mentioned phase difference αs serving as the present phase difference gradually close to the phase difference α. The phase difference αs is input from a starting phase setting section 13 through a first switch 18 when a shift to normal operation is made.

When supplied through an adder 9 with a rotation speed signal (angular velocity ω of induced voltage) contained in an operation command, a voltage setting section 10 performs PI control, P control or the like based on this rotation speed signal, thereby setting a voltage (voltage peak value) V that varies depending on the target rotation speed. In the meantime, the adder 9 disposed upstream of the voltage setting section 10 serves to feed the angular velocity ω detected by the angular velocity detecting section 6 back to the rotation speed signal contained in the operation command, thereby making the rotation speed signal proper, which is then inputted to the voltage setting section 10.

In the normal operation, the PWM signal generating section 11 receives through the third and second switches 20, 19 the voltage V and the voltage phase θ that are individually set by the voltage setting section 10 and the voltage phase setting section 8, and on the basis of the voltage V and the voltage phase θ, creates PWM signals that are to be input to the switching elements 2a–2f of the inverter section 2. In the starting operation, the PWM signal generating section 11 receives through the third and second switches 20, 19 a starting voltage Vs and starting phase (voltage phase for the starting operation) θs individually set by a starting voltage setting section 15 and a starting phase setting section 13, and creates PWM signals to be input to the switching elements 2a–2f of the inverter section 2 on the basis of the starting voltage Vs and the starting phase θs.

A starting rotation speed setting section 12 sets the starting rotation speed (indicating the motor rotation speed at or after the starting) ωs at zero when the motor 1 is at rest. When supplied with an operation command including a predetermined target rotation speed, the starting rotation speed setting section 12 sets, in accordance with formula of ωs=at, the starting rotation speed ωs which is accelerated with a constant angular acceleration a with elapse of time. The reason why the angular acceleration a is kept constant is that load torque caused by the inertia (moment of inertia) of the rotary shaft of the motor 1 can be made constant when the acceleration is performed at a constant angular acceleration a. When the starting rotation speed ωs reaches a predetermined value smaller than the target rotation speed as a result of the acceleration, the starting rotational speed setting section 12 outputs a switch changeover signal CS for making changeover from starting operation to normal operation to the first, second and third switches 18–20.

Based on the starting rotation speed ωs supplied from the starting rotation speed setting section 12, the starting phase setting section 13 makes a calculation to set the starting phase (voltage phase at the time of starting operation) θs in accordance with formula of θs=θ(t−1)+(ωs×Δt). The starting phase θs is used as the voltage phase when the PWM signal generating section 11 creates PWM signals at the time of starting operation. Further, the starting phase setting section 13 has a function of detecting the phase difference αs between current and voltage observed when the starting rotation speed ωs reaches the predetermined value smaller than the target rotation speed and of outputting the phase difference αs to the voltage phase setting section 8 through the first switch 18, as the present phase difference.

A starting current setting section 14 sets the starting current Is at zero when the motor 1 is at rest, and sets, as the starting current Is, a current value corresponding to maximum torque when it receives an operation command including the predetermined target rotation speed. Since the torque required to start the motor 1 is unknown, the maximum value of current which can be caused to flow through the switching elements 2a–2f of the inverter section 2 is set as the starting current Is.

When supplied through an adder 15 with starting current Is set by the starting current setting section 14, a starting voltage setting section 16 performs PI control, P control or the like based on the starting current Is to thereby set the starting voltage (voltage peak value at the time of starting operation) Vs. The adder 15 disposed upstream of the starting voltage setting section 16 serves to feed the current I detected by the current/current phase detecting section 5 back to the starting current Is, making the starting current Is proper which is then input to the starting voltage setting section 16.

Based on the current I detected by the current/current phase detecting section 5, the angular velocity ω detected by the angular velocity detecting section 6, and the voltage V set by the voltage setting section 10, a step-out detecting section 17 detects the step-out, if the voltage V is excessively low or high as compared to the angular velocity ω (corresponding to the rotation speed), for instance. A step-out detection signal is supplied to a control circuit (not shown) for delivering the operation command. When the step-out is caused, an operation command for stopping the motor 1 is delivered from the control circuit.

The first, second and third switches 18–20 serve to change signal paths between when the starting operation is performed and when the normal operation is performed. At the time of starting operation, i.e., before and at the start of the motor, the contacts of the switches assume their positions illustrated by the solid lines, whereas they assume positions shown by the dotted lines. As previously mentioned, the first to third switches 18–20 are changed from the solid line positions to the dotted line positions in response to the switch changeover signal CS supplied from the starting rotation speed setting section 12 when a shift is made from the starting operation to the normal operation. These switches are changed from the dotted line positions to the solid line positions in response to the switch changeover signal CS from the starting rotation speed setting section 12 when a shift is made from the normal operation to a stop mode.

Figure 3:
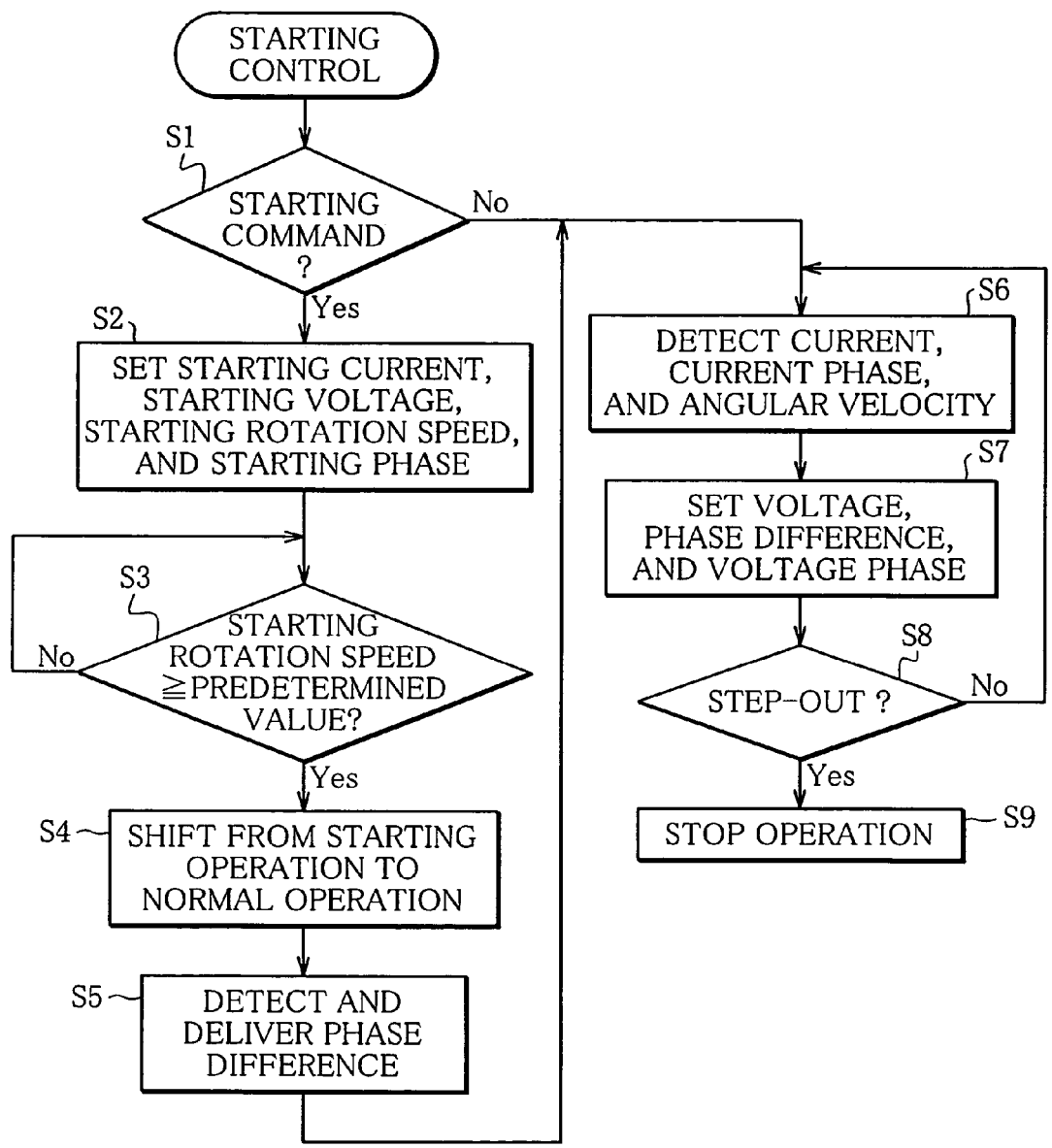
FIG. 3 is a flowchart showing a motor starting method achieved by the motor control apparatus shown in FIG. 1.

In the following, a motor starting method achieved by the motor control apparatus shown in FIG. 1 will be explained with reference to FIG. 3.

When an operation command containing a predetermined target rotation speed is input in a state where the motor 1 is at rest, the starting current Is is set by the aforementioned procedures in the starting current setting section 14. Based on the starting current Is, the starting voltage Vs and the starting rotation speed ωs are set by the starting voltage setting section 16 and the starting rotation speed setting section 12, respectively. Then, the starting phase θs is set by the starting phase setting section 13 based on the starting rotation speed ωs (Steps S1 and S2 in FIG. 3).

Next, the starting voltage Vs and the starting phase θs are input to the PWM signal generating section 11 through the third and second switches 20, 19, respectively. Based on the starting voltage Vs and the starting phase θs, PWM signals for the starting operation are created by the PWM signal generating section 11 and then supplied to the switching elements 2a–2f of the inverter section 2, whereby the starting operation of the motor 1 is performed.

As previously described, the processing for increasing the starting rotation speed ωs is carried out by the starting rotation speed setting section 12 after the start of the motor 1. In addition, at the time of starting the motor 1, the maximum value of current which can be caused to flow through the switching elements 2a–2f of the inverter section 2 is set as the starting current Is. Thus, the start of the motor 1 can be made without difficulty, even if the motor 1 is used to drive a compressor of an air conditioner so that it is applied with the maximum load at the time of starting, or even if the load varies immediately after the starting.

When the starting rotation speed ωs reaches the predetermined value smaller than the target rotation speed, the switch changeover signal CS for causing a shift from starting operation to normal operation is delivered to the first to third switches 18–20, so that the contacts of these switches 18–20 are changed in position from the solid line positions to the dotted line positions. The phase difference αs between current and voltage at the time of changeover is detected by the starting phase setting section 13, and is delivered as the present phase difference to the voltage phase setting section 8 through the first switch 18 (Steps S3–S5 in FIG. 3).

After completion of the changeover to normal operation, the angular velocity ω is detected by the angular velocity detecting section 6 based on the current phase δ detected by the current/current phase detecting section 5. Then, based on the angular velocity ω, the current I and the like, the phase difference α between voltage and current is set by the phase difference setting section 7. Next, the voltage phase θ is set on the basis of the phase difference α and the current phase δ, and the voltage V is set by the voltage setting section 10 (Steps S6, S7 in FIG. 3).

Then, the voltage V is supplied through the third switch 20 to the PWM signal generating section 11, and the voltage phase θ is also supplied thereto through the second switch 19. Based on the voltage V and the voltage phase θ PWM signals for normal operation are created by the PWM signal generating section 11 and supplied to the switching elements 2a–2f of the inverter section 2, whereby the normal operation of the motor 1 is performed.

As previously explained, when a shift is made from the starting operation to the normal operation of the motor 1, the phase difference αs between current and voltage at that time is delivered as the present phase difference through the first switch 18 to the voltage phase setting section 8. If there is a gap between the present phase difference αs and the phase difference α set by the phase difference setting section 7, such gap can cause the step-out. To obviate this, the voltage phase setting section 8 does not use the phase difference a set by the phase difference setting section 7 as is for the calculation of voltage phase θ, but calculates the desired voltage phase θ while performing the processing for bringing the present phase difference αs gradually close to the phase difference α set by the phase difference setting section 7.

After completion of the shift from starting operation to normal operation, the presence/absence of the step-out is detected by the step-out detecting section 7 based on the current I detected by the current/current phase detecting section 5, the angular velocity ω detected by the angular velocity detecting section 6, and the voltage peak value V set by the voltage setting section 10. If there occurs the step-out, for example, if the voltage peak value V is too small or too large as compared to the angular velocity ω (corresponding to the rotation speed), a step-out detection signal is delivered to the control circuit (not shown) for delivering the operation command. Thus, the operation command to stop the motor 1 is delivered from the control circuit when the step-out is caused (Steps S8, S9 in FIG. 3).

In this manner, according to the foregoing motor control apparatus, when the operation command including the predetermined target rotation speed is received in a condition that the motor 1 is at rest, the PWM signals are created based on the starting voltage Vs set by the starting voltage setting section 16 and the starting phase θs set by the starting phase setting section 13, to thereby start the motor 1. After the starting, the processing to increase the starting rotation speed ωs is performed by the starting rotation speed setting section 12. When the starting rotation speed ωs reaches the predetermined value smaller than the target rotation speed, it is determined that the starting has been completed, and a shift is made from the starting operation to the normal operation. Accordingly, it is enough to determine the completion of the starting only once, and hence the determination is easy to carry out and reliable. Besides, a reduction in cost of the control apparatus can be achieved since an arithmetic unit having high processing ability is not required for the determination of completion of the starting.

The starting of the motor 1 can be carried out without fail, even if the motor 1 is used to drive a compressor of an air conditioner so that it receives the maximum load at the starting and even if the load varies immediately after the starting, because, at the time of the starting the motor 1, the maximum value of current which can be caused to flow through the switching elements 2a–2f of the inverter section 2 are set as the starting current Is.

Furthermore, when a shift from starting operation to normal operation is made, the phase difference αs between current and voltage at that time is delivered as the present phase difference from the starting phase setting section 13 to the voltage phase setting section 8 which makes a calculation to set the desired voltage phase θ while performing the processing for bringing the present phase difference αs gradually close to the phase difference α set by the phase difference setting section 7. This makes it possible to prevent the step-out from occurring due to a gap, if any, between the present phase difference αs and the phase difference α set by the phase difference setting section 7.

In the foregoing embodiment, a brushless DC motor is used for the motor 1, however, a synchronous motor of another type such as a reluctance motor can be driven by a control method similar to the one described in the embodiment, whereby similar functions and advantages can be achieved.

What is claimed is:

1. A motor control apparatus comprising:
   PWM signal generation means for creating PWM signals based on a voltage and voltage phase that are individually set by voltage setting means and voltage phase setting means;
   inverter means for converting DC power into predetermined pseudo AC power in accordance with the PWM signals and for outputting the AC power to a synchronous motor;
   starting means for starting the motor with predetermined voltage and voltage phase when receiving an operation command, in which a predetermined target rotation speed is specified, in a state where the synchronous motor is at rest and for gradually increasing a motor speed after the starting of the motor; and
   operation changeover means for changing starting operation to normal operation when the motor speed reaches a predetermined value smaller than the target rotation speed.

2. The motor control apparatus according to claim 1, wherein said starting means includes starting voltage setting means for setting a starting voltage based on a maximum value of current which can be caused to flow through said inverter means, and starting phase setting means for setting starting phase based on the motor speed.

3. The motor control apparatus according to claim 2, further comprising:
   phase difference setting means for setting a phase difference between current and voltage based on current flowing through the motor and the motor rotation speed,
   wherein said starting phase setting means has a function of detecting a phase difference between current and voltage observed when a shift is made from the starting operation to the normal operation, and for delivering the phase difference as a present phase difference to said voltage phase setting means, and
   said voltage phase setting means has a function of bringing the present phase difference received from said starting phase setting means gradually close to the phase difference set by said phase difference setting means.

* * * * *